United States Patent [19]

Matsuura et al.

[11] Patent Number: 4,956,222
[45] Date of Patent: Sep. 11, 1990

[54] FORMABLE VINYL CHLORIDE RESIN COMPOSITION FOR POWDER MOLDING AND METHOD FOR PRODUCING SAME

[75] Inventors: Isao Matsuura, Takatsuki; Akira Wakatsuki, Ibaraki; Yuu Shida, Takatsuki, all of Japan

[73] Assignee: Sumitomo Chemical Company, Limited, Osaka, Japan

[21] Appl. No.: 290,190

[22] Filed: Dec. 27, 1988

[30] Foreign Application Priority Data

Dec. 26, 1987 [JP] Japan .................... 62-331286

[51] Int. Cl.⁵ .................... B05D 7/00; C08J 9/224

[52] U.S. Cl. .................... 428/212; 428/407; 521/57; 521/60; 521/73; 521/75; 521/134; 521/145

[58] Field of Search .................... 521/134, 145, 73, 75, 521/60, 57; 428/212, 407

[56] References Cited

FOREIGN PATENT DOCUMENTS 56-18627  2/1981  Japan .
57-168924 10/1982  Japan .
58-21433  2/1983  Japan .

*Primary Examiner*—Morton Foelak
*Attorney, Agent, or Firm*—Wenderoth, Lind & Ponack

[57] ABSTRACT

The present invention relates to a foamable vinyl chloride resin composition for powder molding containing a foaming agent and method for the production thereof.

4 Claims, No Drawings

FORMABLE VINYL CHLORIDE RESIN COMPOSITION FOR POWDER MOLDING AND METHOD FOR PRODUCING SAME

The present invention relates to a foamable vinyl chloride resin composition for powder molding which is particularly useful to mold cushiony covering materials for automobile interior parts such as crash pads, arm rests, head rests, console boxes, meter covers, door trims, pillars, etc., and a method for producing the same.

In recent years, for such covering materials for automobile interior parts, those which are light in weight, superior in feeling of softness and which have embossed or stitched patterns giving feeling of high grade are required. It is however difficult to meet this requirement by the us of the conventional vacuum-formed product of soft sheets consisting mainly of a vinyl chloride resin and ABS resin. In order to answer this requirement, the powder molding method has attracted public attention.

The feature of this powder molding method consists in that, by rotating or shaking an assembled unit of a mold kept at a temperature of 180° C. or higher and a resin powder supply box, or injecting a resin powder into the mold, the resin powder is fused onto the inner surface of the mold, and the residual unfused powder is recovered automatically or forcedly into the box (Japanese Patent Koaki No. 132507/1983). For heating the mold used in this powder molding method, there are used a method with a gas furnace, method by circulation of a heat medium oil or dipping into a heat medium oil, a high-frequency induction heating method, etc. (Sumitomo Kagaku, No. 1985-I, pp. 84–91).

The covering material produced by the powder molding method, like the conventional vacuum-formed products, is made final molded product by sticking urethane foam to it by foaming in place, and this urethane foam plays the role of a cushion. However, this product having a urethane foam stuck to it has drawbacks that the amine compound, used for urethane foaming, markedly promotes the color change of the covering material made of a vinYl chloride resin, and that urethane, a raw material, is expensive.

Further, production of the cushiony covering material by simultaneously and integrally molding the non-foam layer and foam layer by the powder molding method is on trial. This powder two-layer molding method is a method in which firstly a powder resin composition containing no foaming agent is fused onto a mold heated to a high temperature, secondly a powder resin composition containing a foaming agent is attached to the mold, and then the mold is kept at a temperature higher than the decomposition temperature of the foaming agent to produce a two-layer molded product, or when the mold cannot be kept at the temperature the foaming agent is foamed by heating to produce the two-layer molded product. The fundamental principle of this method is known (Japanese Patent Publication No. 11510/1967). In this powder molding, the powder foamable resin composition should be excellent in powder flowability like the powder resin composition.

In producing this powder foamable resin composition, there is used a known method of dry-blending a polyvinyl chloride resin with a plasticizer, stabilizer, foaming agent and other auxiliaries by means of a blender or high-speed rotating mixer equipped with a heating jacket. Also in order to improve the powder flowability, it is well known to add a finely powdered polyvinyl chloride resin and a finely powdered inorganic powder (e.g. calcium carbonate, silica gel) at the cooling step after completion of the dry-blending (Rubber Digest, Vol. 14, No. 8, pp. 32–40; Polyvinyl Chloride Its Chemistry and Industry II, pp. 367–370, 1968; and Japanese Patent Publication No. 1575/1962).

Referring now to the foamable resin composition, it is hitherto known to give foamability to a polyvinyl chloride resin composition by blending a foaming agent (Japanese Patent Kokai No. 111337/1986). However, even foams produced with this composition are not always satisfactory in shape recovery after compression, and also they are low in the percentage of closed cells. In order to solve this problem, blending a crosslinking component is known. For example, a foamable composition comprising blending a vinyl chloride copolymer containing a hydroxyl and carboxyl groups with a crosslinking agent is disclosed in Japanese Patent Publication Nos. 16498/1977, 44588/1977 and 20985/1979, Japanese Patent Kokai No. 18665/1978 and Japanese Patent Publication No. 27818/1983, etc. Further, a vinyl chloride foamable composition containing a thermoplastic polyurethane and acrylic resin is disclosed, for example, in Japanses Patent Kokai Nos. 141729/1985 and 141730/1985, etc.

Further, examples of the vinyl chloride foamable composition of which the thermoplastic polyurethane component is a reaction product of a bifunctional polyol with diisocyanate having a hydroxyl group at the terminals of the molecule are disclosed, for example in Japanese Patent Kokai Nos. 18627/1981 and 168924/1982 and Japanese Patent Publication No. 20220/1987, etc. However, these foamable compositions ar only a dry-blended product, being too poor in the powder flowability to be suitable for the powder molding method, although usable in extrusion molding, calender molding, press molding, etc.

An object of the present invention is to solve the foregoing problems of the prior arts. That is, the present invention provides a foamable vinyl chloride resin composition for powder molding which contains no coarse agglomerate particles, has powder flowability suitable for powder molding is excellent in the foamability such as an expansion ratio and which produces a foam having flexibility and good shape recovery after compression, and a method for producing the same.

In order to solve the foregoing requirements, the present inventors have extensively studied a method for producing the foamable vinyl chloride resin composition for powder molding excellent in the powder flowability and foamability without forming coarse agglomerate particles.

As a result, the present inventors have found that the desired powder foamable resin composition excellent in the powder flowability and foamability can be obtained without forming coarse agglomerate particles by carrying out dry-blending in the following manner: The first step is carried out in which a plasticizer is added to the vinyl chloride resin to allow the resin to absorb the plasticizer, and after the temperature of the mixture reaches a certain particular temperature the second step is carried out in which at least one particular polymer having an active hydrogen in the molecule and a crosslinkable isocyanate compound are added. The present inventors have thus completed the present invention.

The present invention provides a foamable vinyl chloride resin composition for powder molding characterized in that said composition is produced by a method of which the fundamental constitution is as follows: The first step is carried out in which from 40 to 120 parts by weight, preferably from 50 to 100 parts by weight of a plasticizer is blended with 100 parts by weight of a granular vinyl chloride resin obtained by suspension polymerization or bulk polymerization, thereby to allow the resin to absorb the plasticizer, during which it is preferred to add a foaming agent and a stabilizer; the second step is carried out in which from 0.5 to 40 parts by weight, preferably from 1 to 20 parts by weight of at least one polymer or copolymer having an active hydrogen in the molecule [component (A)] and from 0.1 to 10 parts by weight, preferably from 0.2 to 5 parts by weight of a crosslinkable isocyanate compound [component (B)] are added and dry-blended; and while the temperature of the dry-blend system is in the course of cooling after it has reached a maximum temperature, the third step is carried out in which from 3 to 25 parts by weight, preferably from 5 to 20 parts by weight of a finely powdered vinyl chloride resin obtained by emulsion polymerization or micro-suspension polymerization is added at a temperature preferably lower than about 50° C. to coat the dry-blend, and a method for producing the same.

The feature of the present invention consists in the structure of the foregoing components (A) and (B) and the time of addition of the components.

The compound used as the component (A) is preferably a vinyl chloride copolymer or acrylic polymer having an active hydrogen in the molecule. This copolymer or polymer may be used alone or in combination.

When the vinyl chloride copolymer having an active hydrogen in the molecule is used as the component (A), the time of its addition in the second step is selected so that said addition is carried out after the temperature of the dry-blend system has reached about 90° C., preferably about 100° C. in the course of temperature-increase.

When the acrylic polymer having an active hydrogen in the molecule is used as the component (A), the time of its addition in the second step is selected so that said addition is carried out after the temperature of the dry-blend system reaches about 90° C., preferably about 100° C. in the course of temperature-increase and before it falls to about 100° C. in the course of cooling.

The addition of component (B) is carried out after the temperature of the dry-blend system has reached about 90° C, preferably about 100° C. in the course of temperature-increase. When the foregoing components are added at a temperature outside the scope of the temperature condition of the present invention, coarse agglomerate particles are easily formed and the powder moldability becomes bad, which are not desirable.

In the dry-blending process of the present invention, the rate of temperature-increase in the temperature-increase course from the first step to the second step is 5°-20° C./min, preferably 5°-12° C./min. Further, the rate of cooling in the cooling course is 5°-25° C./min, preferably 5°-15° C./min.

Every component used in the present invention will be illustrated in detail.

As examples of the vinyl chloride resin obtained by suspension polymerization or bulk polymerization, there are mentioned vinyl chloride polymers produced by suspension polymerization or bulk polymerization, copolymers of vinyl chloride with a monomer copolymerizable therewith (e.g. ethylene, propylene, vinyl acetate), graft copolymers of vinyl chloride with an ethylene/vinyl acetate copolymer and a mixture of two or more of these polymers. However, the vinyl chloride resin of the present invention is not limited to those described above. The average particle diameter of the granular vinyl chloride resin obtained by suspension polymerization or bulk polymerization is from 50 to 200 $\mu$m, preferably from 80 to 170 $\mu$m, more preferably from 100 to 150 $\mu$m.

As examples of the vinyl chloride copolymer having an active hydrogen in the molecule, there are mentioend copolymers of a vinyl chloride monomer with a monomer having an active hydrogen in the molecule (e.g. a monomer having a hydroxyl, epoxy or carboxyl group) produced by the common suspension polymerization or emulsion polymerization or other known polymerization methods. Representative examples of the copolymer include vinyl chloride copolymer of a vinyl chloride monomer with 2-hydroxyethyl acrylate, 2-hydroxyethyl methacrylate, 2-hydroxypropyl acrylate, 2-hydroxypropyl methacrylate, 3-chloro-2-hydroxypropyl methacrylate, 3-hydroxybutyl acrylate, ethyl-2-hydroxyethyl fumarate, 3-hydroxybutyl vinyl ether, glycidyl acrylate, glycidyl methacrylate, acrylic acid, methacrylic acid, monobutyl maleate, undecylenic acid or the like. These copolymers can be used in an mount of from 0.5 to 25 parts by weight based on 100 parts by weight of the vinyl chloride resin. When the amount is less than 0.5 part by weight, the crosslinking effect is not developed. while addition of an amount larger than 25 parts by weight is vain because the crosslinking effect does not change.

As the acrylic polymer (A) used in the present invention, there are used elastic copolymers of alkyl acrylate, which is a main component, with a sub-component having an active group acting as a crosslinking point. For example, there are mentioned copolymers comprising as a main component one or more alkyl acrylates (e.g. ethyl acrylate, propyl, acrylate, butyl acrylate, 2-ethylhexyl acrylate) and as a sub-component allyl glycidyl ether, glycidyl acrylate, glycidyl methacrylate, hydroxyethyl acrylate, hydroxyethyl methacrylate, 2-chloroethyl vinyl ether, etc. having an active group acting as a corsslinking point. Particularly, acrylic copolymers having an epoxy or hydroxyl group as an active group are preferably used.

The acrylic copolymer can be used in an amount of from 0.5 to 25 parts by weight based on 100 parts by weight of the vinyl chloride resin. When the amount is less than 0.5 part by weight, the crosslinking effect is not developed at the time or molding of the foam, so that the shape recovery is poor. The acrylic copolymer improves the dispersibility by fusing it onto the surface of the vinyl chloride resin by applying heat. However, when an amount more than 25 parts by weight is added, the powdery composition becomes tacky to worsen the powder flowability.

The component (A) may be a combination of the foregoing vinyl chloride copolymer and acrylic polymer having an active hydrogen in the molecule. In this case, the sum of the both copolymers is in a range of from 0.5 to 40 parts by weight, preferably from 1 to 20 parts by weight.

Instead of component (A) described above, saponified products of vinylester polymers or copolymers such as vinylacetate polymer or ethylene-vinylacetate copolymer can be used.

As the crosslinkable isocyanate compound (B) used in the present invention, there are mentioned compounds having in the molecule two or more functional groups capable of reacting with the active hydrogen of the polymer (A), for example compounds having an isocyanate or blocked isocyanate group in the molecule. Representative examples of these compounds include: Polyisocyanates such as tolylene diisocyanate, diphenylmethane diisocyanate, polymethylenepolyphenyl isocyanate, etc.; initial addition polymers of the foregoing polyisocyanates with an at least bifunctional active hydrogen-containing compound (e.g trimethylolpropane, pentaerythritol, glycerin, polyethylene glycol, polytetramethylene glycol, polyethylene adipate), said polymers having an isocyanate group at the terminal of the molecule; and blocked isocyanates produced by blocking the isocyanate group of the foregoing polyisocyanates and initial addition polymers with phenol, diethyl malonate, acetoacetic acid esters, acetoxime, sodium hydrogensulfite or other masking agents. These crosslinkable isocyanate compounds can be used in an amount of from 0.1 to 10 parts by weight, preferably from 0.2 to 5 parts by weight based on 100 parts by weight of the vinyl chloride resin. When the amount is less than 0.1 part by weight, the crosslinking effect is not sufficient. While addition of an amount larger than 10 parts by weight is vain because there is no large amount-increase effect.

In the dry-blending process the polymer (A) having an active hydrogen in the molecule and the crosslinkable isocyanate compound (B) used in the present invention need to be added after the plasticizer is added t the vinyl chloride resin obtained by suspension polymerization or bulk polymerization, thereby to allow the resin to absorb the plasticizer and then the temperature of the resulting dry-blend reaches about 90° C., preferably about 100° C. in the course of temperature-increase. When they are added before the temperature of the dry-blend reaches about 90° C. in the course of temperature-increase absorption of the plasticizer by the vinyl chloride resin obtained by suspension polymerization or bulk polymerization is not sufficient. Because of this, the polymer (A) having an active hydrogen in the molecule absorbs the plasticizer to become tacky and the polymer particles cling to one another to not only grow into a large amount of coarse agglomerate particles but also make it impossible to finally obtain the powder composition having a good powder flowability. When such the coarse agglomerate particles are present in the powder composition good molded products also cannot be obtained by powder molding. Consequently, such the powder composition, after it has been produced, is screened, for example, through a 32-mesh wire net to separate into a portion which passes through the wire net and a portion which is caught thereon, and the former fine particles are used for powder molding and the latter coarse agglomerate particles need to be discarded. When such the coarse agglomerate particles are formed in large amounts, the amount of the particles discarded also increases to lower the productivity which is not desirable. Further, when the polymer having an active hydrogen in the molecule absorbs the plasticizer, the crosslinking effect lowers when the foam is molded later, which is not desirable.

The finely powdered vinyl chloride resin for coating used in the present invention includes vinyl chloride polymer and copolymers of vinyl chloride with a monomer copolymerizable therewith such as ethylene, propylene, vinyl acetate, etc. having an average unit particle diameter of from 0.1 to 10 $\mu$m produced by emulsion polymerization or micro-suspension polymerization.

It is preferred that the finely powdered vinyl chloride resin for coating used in the present invention is added at a temperature lower than 50° C. in the course of cooling of the dry-blend. By selecting such the temperature conditions, the foamable composition for powder molding excellent in the powder flowability can be produced.

The plasticizer used in the present invention includes phthalic acid esters such a diisodecyl phthalate, diisoundecyl phthalate, dialkyl phthalates having a $C_9$–$C_{11}$ alkyl group, etc.; and trimellitic acid esters such as trioctyl trimellitate, tri-2-ethylhexyl trimellitate, tridecyl trimellitate, trialkyl trimellitates having a $C_7$–$C_9$ or $C_7$–$C_{11}$ alkyl group.

A small amount of an epoxy or polyester plasticizer may be used, but these plasticizers are not always used.

As the foaming agent used in the present invention, the common decomposable foaming agents are properly used as need arises without being limited. For example, there ar mentioned azodicarbonamide, p,p'-oxybisbenzenesulfonyl hydrazide, p-toluenesulfonyl hydrazide, benzenesulfonyl hydrazide, etc. These compounds ma be used alone or in a mixture of two or more of them. Particularly, azodicarbonamide is preferably used.

In the present invention, a foaming assistant may be used. The foaming assistant includes inorganic zinc salts (e.g. zinc white, zinc nitrate), zinc/fatty acid soaps (e.g. zinc octoate, zinc stearate), urea, etc. These compounds may be used alone or in combination of two or more of them.

The stabilizer used in the present invention includes the compounds of a metal (e.g. zinc, barium, sodium, potassium, calcium, lithium, tin), for example the salts of a carboxylic acid with these metals. Particularly, composite stabilizers of these metallic compounds, for example carboxylic acid salts, and organic stabilizers such as epoxy compounds, etc. are mentioned.

In the method for producing the composition of the present invention, fillers, pigments, etc. may be added if necessary in addition to the foregoing blending agents.

The present invention will be illustrated more specifically with reference to the following examples, but it is not limited to these examples.

EXAMPLE 1

Blending:
Fundamental component:

| | |
|---|---|
| Polyvinyl chloride resin (suspension-polymerized polymer; average particle diameter, 120 $\mu$m; average degree of polymerization (P), 700) | 90 parts by weight |
| Finely powdered polyvinyl chloride resin (micro-suspension-polymerized polymer; average unit particle diameter, 1 $\mu$m; average degree of polymerization (P), 1600) | 10 parts by weight |
| Diisodecyl phthalate (plasticizer) | 70 parts by weight |
| Barium octoate/zinc octoate stabilizer | 3 parts by weight |
| Azodicarbonamide (foaming agent) | 4 parts by weight |
| Crosslinking component: | |
| (A) Vinyl chloride/2-hydroxypropyl acrylate copolymer (emulsion-polymerized polymer; average unit particle diameter, 0.9 $\mu$m content of 2-hydroxypropyl acrylate, 3 mole %; average degree of polymerization (P), 1300) | 5 parts by weight |
| (B) Trimethylolpropane/tolylenediisocyanate adduct | 0.5 part by weight |

The above suspension-polymerized polyvinyl chloride resin was put in a supermixer and stirred with heating at a definite speed of rotation. When the resin temperature reached 80° C., the foregoing plasticizer, stabilizer and foaming agent were added and dry-blended. At a point when the temperature of the composition reached 120° C., the foregoing crosslinking components were added, and stirring was further continued. At a point when the temperature of the composition reached 125° C., cooling was started, and when the composition was cooled to 50° C., the foregoing finely powdered polyvinyl chloride resin was uniformly dispersed in the composition to obtain a powdery foamable resin composition having a good powder flowability. On screening the resulting composition through a 32-mesh wire net, it was found that the composition which passed through the wire net was 99.5 wt. % and coarse agglomerate particles caught on the wire net was 0.5 wt. %. Using the composition thus obtained, a foamed sheet was prepared by the following method, and the powder flowability of the powder composition and the foamability of the foamed sheet were evaluated according to the following item and method of evaluation. The results are shown in Table 1.

A flat nickel mold was pre-heated for 5 minutes in a Geer oven kept at 280° C. The mold temperature at that time was about 210° C. Immediately, the foregoing powdery vinyl chloride composition was sprinkled on this mold, and after about 10 seconds, the excess powder composition was removed. The mold was then put in a Geer oven kept at an atmospheric temperature of 240° C. and re-heated for 1 minute to carry out foaming. After cooling, the molded product was taken out of the mold to obtain foamed sheet. The powder composition and the foam were evaluated by the following methods.

Item and method of evaluation:

(1) Powder flowability

100 Milliliters of the composition was put in the funnel of the bulk specific gravity measuring apparatus described in JIS K 6721, and after the damper was pulled out of the funnel, a time which elapsed from the beginning of falling of the sample from the funnel until completion of the falling was measured in second.

(2) Moldability

In preparing the foam, the state of attachment of the powder composition to the mold was observed at a point when the composition was sprinkled on the heated mold and then removed therefrom.

E (Excellent): Uniform attachment without unevenness in thickness.

G (Good): Almost uniform attachment with some degree of unevenness in thickness.

SG (Somewhat good): Somewhat nonuniform attachment with fairly unevenness in thickness.

P (Poor): Non-uniform attachment with remarkable unevenness in thickness.

(3) Expansion ratio

Calculated from the following equation:

$$\text{Expansion ratio (time)} = \frac{\text{density of molded product of non-foamable composition}}{\text{density of foam}}$$

(4) Percentage of closed cells

The percentage of open cells was measured by means of Beckman's air-comparison pycnometer model 930, and the percentage of closed cells was calculated according to the following equation:

$$\text{Percentage of closed cells (\%)} = 100 - \left(\text{percentage of open cells}\right) - \left(\frac{\text{density of foam}}{\text{density of molded product of non-foamable composition}} \times 100\right)$$

(5) Shape recovery after compression

The foam was completely pressed with a finger for 10 seconds, and the state of recovery after release of the pressure was judged macroscopically.

E (Excellent): Immediate shape recovery after release of pressure without leaving traces.

G (Good): Shape recoverly within 5 seconds with traces remaining.

SG (Somewhat good): Shape recoverly within 10 seconds with traces remaining.

P (Poor): No shape recovery even after 10 seconds with traces remaining.

EXAMPLES 2 TO 4 AND COMPARATIVE EXAMPLES 1 TO 4

Using the same blending agents as used in Example 1, various powdery compositions were prepared in the same manner as in Example 1 except that there were changed the amount of each blending agent and the temperature at which the crosslinking component was added. Every powdery composition was screened through a 32-mesh wire net, and the amount of coarse agglomerate particles left on the wire net at that time was measured. The amount is shown in wt. % in Tables 1 and 2.

Further, the powdery compositions and foamed sheets obtained in the same manner as in Example 1 were evaluated for the powder flowability and foamability, respectively. The results are shown in Tables 1 and 2.

TABLE 1

|  | Example | | | |
|---|---|---|---|---|
|  | 1 | 2 | 3 | 4 |
| Blending (part by weight): | | | | |
| Vinyl chloride resin | 90 | 90 | 90 | 90 |
| Finely powdered vinyl chloride resin | 10 | 10 | 10 | 10 |
| Diisodecyl phthalate (plasticizer) | 70 | 70 | 70 | 70 |
| (A-1) Vinyl chloride copolymer having an active hydrogen | 5 | 15 | 5 | 5 |
| (A-2) Acrylic polymer having an active hydrogen | — | — | — | — |
| (B) Crosslinkable isocyanate | 0.5 | 3 | 0.5 | 0.5 |

TABLE 1-continued

| | Example | | | |
|---|---|---|---|---|
| | 1 | 2 | 3 | 4 |
| compound | | | | |
| Temperature at which components (A) and (B) are added | 120° C. in the course of temperature-increase | 120° C. in the course of temperature-increase | 105° C. in the course of temperature-increase | 80° C. in the course of cooling |
| Amount of coarse agglomerate particles (wt. % of particles having a particle diameter of 32-mesh or more) | 0.5 | 0.7 | 1.2 | 0.4 |
| Results of evaluation: | | | | |
| Molding and foaming characteristics: | | | | |
| Powder flowability (sec) | 17 | 18 | 20 | 16 |
| Moldability | G | G-E | G-E | G |
| Expansion ratio (time) | 6.5 | 6.2 | 6.4 | 6.5 |
| Property of foam: | | | | |
| Percentage of closed cells (%) | 46 | 52 | 40 | 43 |
| Shape recovery after compression | G | G-E | G | G |

(A-1): Vinyl chloride/2-hydroxypropyl acrylate copolymer
(A-2): Hydroxyethyl acrylate/acrylic acid ester copolymer
(B): Trimethylolpropane/tolylene-diisocyanate adduct
E: Excellent
G: Good
SG: Somewhat good
P: Poor

TABLE 2

| | Comparative example | | | |
|---|---|---|---|---|
| | 1 | 2 | 3 | 4 |
| Blending (part by weight): | | | | |
| Vinyl chloride resin | 90 | 90 | 90 | 90 |
| Finely powdered vinyl chloride resin | 10 | 10 | 10 | 10 |
| Diisodectyl phthalate (plasticizer) | 70 | 70 | 70 | 70 |
| (A-1) Vinyl chloride copolymer having an active hydrogen | — | 5 | — | 5 |
| (A-2) Acrylic polymer having an active hydrogen | — | — | — | — |
| (B) Crosslinkable isocyanate compound | — | — | 2 | 0.5 |
| Temperature at which components (A) and (B) are added | — | 120° C. in the course of temperature-increase | 120° C. in the course of temperature-increase | 85° C. in the course of temperature-increase |
| Amount of coarse agglomerate particles (wt. % of particles having a particle diameter of 32-mesh or more) | 0.3 | 0.6 | 0.5 | 4.5 |
| Results of evaluation: | | | | |
| Molding and foaming characteristics: | | | | |
| Powder flowability (sec) | 17 | 19 | 17 | 24 |
| Moldability | G | G | G | P |
| Expansion ratio (time) | 6.6 | 6.6 | 6.5 | 6.3 |
| Property of foam: | | | | |
| Percentage of closed cells (%) | 20 | 26 | 21 | 32 |
| Shape recovery after compression | P | P | P | SG |

EXAMPLE 5

| Blending: | |
|---|---|
| Fundamental component: | |
| Polyvinyl chloride resin (suspension-polymerized polymer; average particle diameter, 120 μm; average degree of polymerization (P), 700; a product of Sumitomo Chemical Co., Ltd.) | 90 parts by weight |
| Finely powdered polyvinyl chloride resin (micro-suspension-polymerized polymer; average degree of polymerization (P), 1300; average unit particle diameter, about 1 μm; a product of Sumitomo Chemical Co., Ltd.) | 10 parts by weight |

-continued

| | |
|---|---|
| Diisodecyl phthalate (plasticizer) | 70 parts by weight |
| Barium octoate/zinc octoate stabilizer | 3 parts by weight |
| Azodicarbonamide (foaming agent) | 4 parts by weight |
| Crosslinking component: | |
| (A) Acrylic copolymer (hydroxyethyl acrylate/acrylic acid ester copolymer) | 4 parts by weight |
| (B) Trimethylolpropane/ tolylenediisocyanate adduct | 1 part by weight |

The above suspension-polymerized polyvinyl chloride resin was put in a supermixer and stirred with heating at a definite speed of rotation. When the resin temperature reached 80° C., the foregoing plasticizer, stabilizer and foaming agent were added and dry-blended. At a point when the temperature of the composition reached 120° C., the foregoing crosslinking components were added, and stirring was further continued. At a point when the temperature of the composition reached 125° C., cooling was started, and when the composition was cooled to 50° C., the foregoing finely powdered polyvinyl chloride resin was uniformly dispersed in the composition to obtain a powdery foamable resin composition having a good powder flowability. Using the composition thus obtained, a foamed sheet was prepared by the following method and evaluated. The results are shown in Table 3.

A flat nickel mold was pre-heated for 5 minutes in a Geer oven kept at 280° C. The mold temperature at that time was about 210° C. Immediately, the foregoing powdery vinyl chloride composition was sprinkled on this mold and after about 10 seconds, the excess powder composition was removed. The mold was then put in a Geer oven kept at an atmospheric temperature of 240° C. and re-heated for 1 minute to carry out foaming. After cooling, the molded product was taken out of the mold to obtain a foamed sheet.

EXAMPLES 6 TO 12 AND COMPARATIVE EXAMPLES 5 TO 8

Using the same crosslinking components as used in Example 5, various powdery compositions were prepared in the same manner as in Example 5 except that there were changed the amounts of the crosslinking components and the temperature at which the components were added.

Foams were prepared and evaluated by the same method as in Example 5. The results are shown in Tables 3 and 4.

The vinyl chloride copolymer having an active hydrogen in the molecule used in Examples and Comparative examples was a vinyl chloride/2-hydroxypropyl acrylate copolymer.

TABLE 3

| | Example | | | | | | | |
|---|---|---|---|---|---|---|---|---|
| | 5 | 6 | 7 | 8 | 9 | 10 | 11 | 12 |
| Blending (part by weight): | | | | | | | | |
| Vinyl chloride resin | 90 | 90 | 90 | 90 | 90 | 90 | 90 | 90 |
| Finely powdered vinyl chloride resin | 10 | 10 | 10 | 10 | 10 | 10 | 10 | 10 |
| Diisodecyl phthalate (plasticizer) | 70 | 70 | 70 | 70 | 70 | 70 | 70 | 70 |
| (A-1) Vinyl chloride copolymer having an active hydrogen | — | — | — | — | 4 | 8 | — | — |
| (A-2) Acrylic polymer having an active hydrogen | 4 | 8 | 16 | 8 | 8 | 4 | 4 | 4 |
| (B) Crosslinkable isocyanate compound | 1 | 2 | 4 | 4 | 3 | 3 | 1 | 1 |
| Temperature at which components (A) and (B) are added | 120° C. in the course of temperature-increase | 120° C. in the course of temperature-increase | 120° C. in the course of temperature-increase | 120° C. in the course of temperature-increase | 120° C. in the course of temperature-increase | 120° C. in the course of temperature-increase | 100° C. in the course of temperature-increase | 100° C. in the course of cooling |
| Amount of coarse agglomerate particles (wt. % of particles having a particle diameter of 32-mesh or more) | 0.8 | 1.1 | 1.5 | 1.2 | 1.1 | 0.8 | 1.8 | 1.7 |
| Results of evaluation: | | | | | | | | |
| Molding and foaming characteristics: | | | | | | | | |
| Powder flowability (sec) | 18 | 19 | 20 | 19 | 19 | 19 | 19 | 19 |
| Moldability | G | G | G | G | G | G-E | G | G |
| Expansion ratio (time) | 6.4 | 6.3 | 6.2 | 6.3 | 6.2 | 6.3 | 6.4 | 6.4 |
| Property of foam: | | | | | | | | |
| Percentage of closed cells (%) | 43 | 50 | 58 | 52 | 54 | 53 | 43 | 43 |
| Shape recovery after compression | G | G-E | E | G-E | G-E | G-E | G | G |

TABLE 4

| | Comparative example | | | |
|---|---|---|---|---|
| | 5 | 6 | 7 | 8 |
| Blending (part by weight): | | | | |
| Vinyl chloride resin | 90 | 90 | 90 | 90 |
| Finely powdered vinyl chloride resin | 10 | 10 | 10 | 10 |
| Diisodecyl phthalate (plasticizer) | 70 | 70 | 70 | 70 |
| (A-1) Vinyl chloride copolymer having an active hydrogen | — | — | — | — |
| (A-2) Acrylic polymer having an active hydrogen | 0.4 | 30 | 4 | 4 |
| (B) Crosslinkable isocyanate compound | 0.1 | 7.5 | 1 | 1 |
| Temperature at which components (A) and (B) are added | 120° C. in the course of | 120° C. in the course of | 80° C. in the course of | 80° C. in the course of |

TABLE 4-continued

|  | Comparative example | | | |
|---|---|---|---|---|
|  | 5 | 6 | 7 | 8 |
|  | temperature-increase | temperature-increase | temperature-increase | cooling |
| Amount of coarse agglomerate particles (wt. % of particles having a particle diameter of 32-mesh or more) | 0.4 | 4.3 | 10.5 | 6.7 |
| Results of evaluation: | | | | |
| Molding and foaming characteristics: | | | | |
| Powder flowability (sec) | 17 | 28 | 23 | 19 |
| Moldability | G | P | SG | G |
| Expansion ratio (time) | 6.6 | 5.8 | 6.5 | 6.5 |
| Property of foam | | | | |
| Percentage of closed cells (%) | 25 | 60 | 30 | 20 |
| Shape recovery after compression | P | G | SG | P |

What is claimed is:

1. A powdery foamable vinyl chloride resin composition for powder molding containing a foaming agent wherein said composition is produced by the following dry-blending method:

a first step wherein from 40 to 120 parts by weight of plasticizer is blended with 100 parts by weight of a granular vinyl chloride resin having an average particle diameter of from 50 to 200 μm obtained by suspension polymerization or bulk polymerization to form first dry-blend particles; and after said first dry-blend particles have reached about 90° C. in the course of a temperature increase, a second step wherein from 0.5 to 40 parts by weight of at least one polymer or copolymer having an active hydrogen in the molecule (component A) and from 0.1 to 10 parts by weight of a crosslinkable isocyanate compound (component B) are added and dry-blended to cover said first dry-blend particles with said components (A) and (B), thus forming second dry-blend particles; and while said second dry-blend particles are cooling after they have reached a maximum temperature, a third step wherein from 3 to 25 parts by weight of a finely powdered vinyl chloride resin having an average unit particle diameter of 0.1 to 10 μm and obtained by emulsion polymerization or micro-suspension polymerization is added to cover said second dry-blend particles, said foaming agent being added in said first step.

2. The powdery foamable vinyl chloride resin composition for powder molding according to claim 1, wherein said polymer or copolymer having an active hydrogen in the molecule is a vinyl chloride copolymer or acrylic polymer.

3. The powdery foamable vinyl chloride resin composition for powder molding according to claim 1, wherein after the temperature of the dry-blend system has reached about 90° C. in the course of a temperature-increase and before it falls to about 100° C. in the course of cooling, the second step is carried out in which the acrylic copolymer having an active hydrogen in the molecule (component A) is blended with the system.

4. The powdery foamable vinyl chloride resin composition for powder molding according to claim 1, wherein when the temperature of the dry-blend system falls to a temperature lower than about 50° C. in the course of cooling after it has reached a maximum temperature, the third step is carried out in which the finely powdered vinyl chloride resin obtained by emulsion polymerization or micro-suspension polymerization is added to coat the dry-blend.

* * * * *